C. E. BOBERG.
DIRECTION INDICATOR.
APPLICATION FILED SEPT. 15, 1914.
1,212,316.
Patented Jan. 16, 1917.
2 SHEETS—SHEET 1.
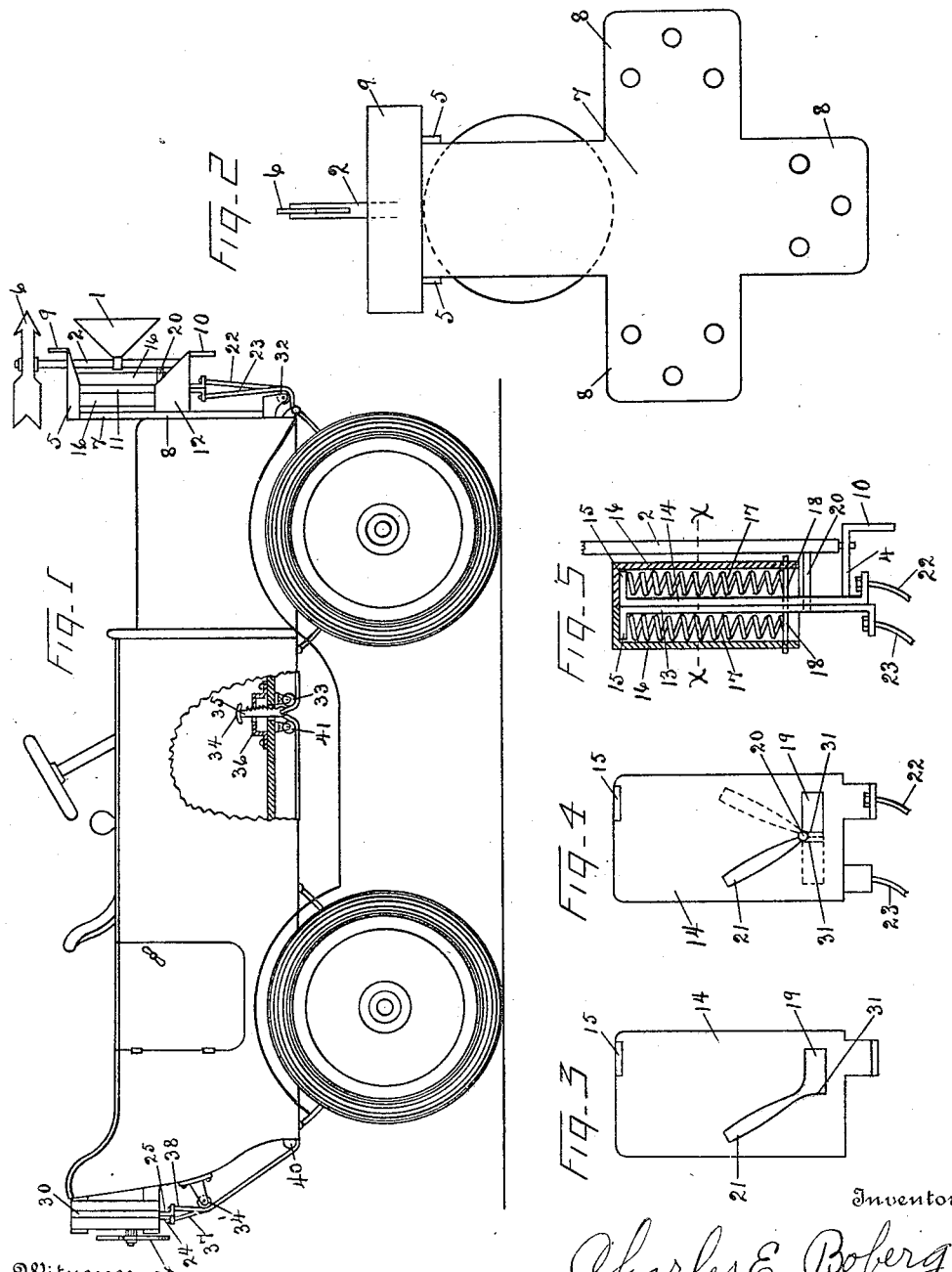
Inventor
Charles E. Boberg,
By A. L. Jackson,
Attorney
Witnesses
A. N. Evans
W. L. Chambers C. E. BOBERG.
DIRECTION INDICATOR.
APPLICATION FILED SEPT. 15, 1914.
1,212,316.
Patented Jan. 16, 1917.
2 SHEETS—SHEET 2.
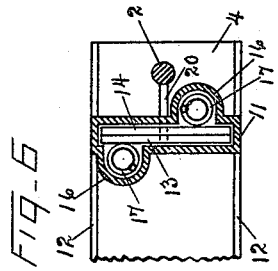
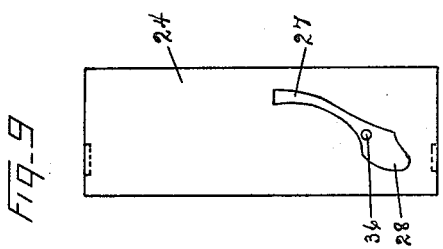
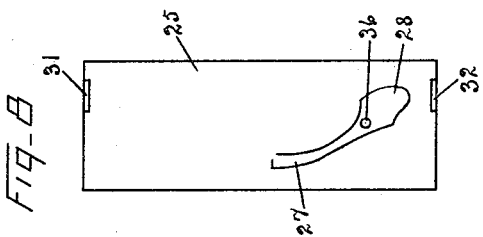
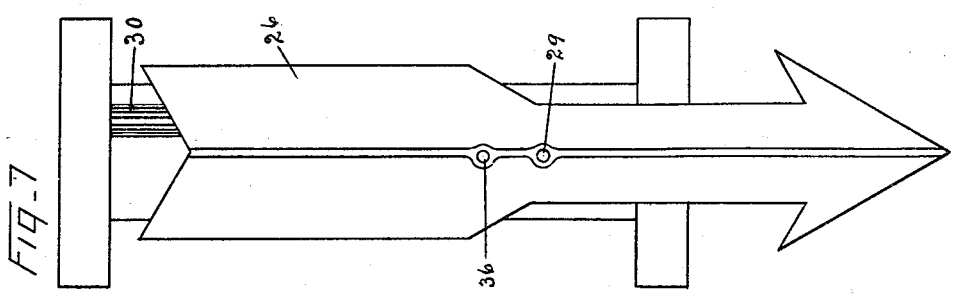
Witnesses
A. N. Evans
M. L. Chambers
Inventor
Charles E. Boberg,
By A. L. Jackson,
Attorney

UNITED STATES PATENT OFFICE.

CHARLES E. BOBERG, OF FORT WORTH, TEXAS.

DIRECTION-INDICATOR.

1,212,316.  Specification of Letters Patent.  Patented Jan. 16, 1917.

Application filed September 15, 1914. Serial No. 861,798.

*To all whom it may concern:*

Be it known that I, CHARLES E. BOBERG, a citizen of the United States, residing at Forth Worth, in the county of Tarrant and State of Texas, have invented certain new and useful Improvements in Direction-Indicators, of which the following is a specification.

My invention relates to new and useful improvements in signaling devices and more particularly to signaling devices for automobiles or other moving vehicles and which can be used in the light and in the dark; and the object is to provide simple devices which can be easily operated to indicate whether a vehicle is going to turn to the right or to the left whether in the light or in the dark.

A further object is to provide devices on the front and the rear of a vehicle and to provide means for operating both signaling devices simultaneously.

A further object is to provide devices for operating the signaling devices which will restore the signaling devices to their normal positions as soon as released and automatically lock the signaling devices against movement in their normal positions.

A further object is to provide devices for operating signals which will simultaneously operate lamps and other indicating devices.

Other objects and advantages will be fully explained in the following description and the invention will be more particularly pointed out in the claims.

Reference is had to the accompanying drawings which form a part of this application.

Figure 1 is a side elevation of an automobile, partly in section, showing the attachments in front and in the rear of the automobile. Fig. 2 is a rear elevation of the front signaling devices. Fig. 3 is a face view of one of the operating slides. Fig. 4 is view of same with the coöperating slide placed therewith, as in operation. Fig. 5 is a vertical section of the guide casing for the operating slides, showing an edge view of both slides. Fig. 6 is a horizontal section, taken on the line $x$—$x$ of Fig. 5. Fig. 7 is a rear elevation of the signaling devices on the rear of the vehicle. Fig. 8 is a face view of one of the slides for operating the signaling device shown in Fig. 7. Fig. 9 is a face view of a coöperating slide.

Similar characters of reference are used to indicate the same parts throughout the several views.

The improved operating mechanism is adapted to operate both lamps or lights and other indicating devices. A lamp or light 1 of any suitable design, oil, gas, or electric, is mounted on a vertical shaft 2 which is journaled in a frame composed of side frame pieces 5, 7, and 12, and horizontal portions 4. The frame is attached to a convenient part of the automobile,—in the present case to the front of the radiator by extensions 8. An indicator in the form of an arrow is mounted in the shaft 2 and made rigid therewith. The frame carries plates 9 and 10 on which numbers and names can be printed or painted. The parts for moving or turning the light 1 and indicator 6 are mounted in a casing 11 which is rigid with the frame. The casing 11 has extensions 16 which form guides for spring seats 15 on the operating slides 13 and 14 which move vertically in the casing 11. The slides 13 and 14 are the immediate elements which turn the light and indicating devices. The slides 13 and 14 are duplicates in every respect and are turned with their backs to each other in operation. Each slide has a horizontal slot 19 and an angular or cam slot 21.

Fig. 4 illustrates the normal position of the slides and a pin 20 which is rigid with the shaft 2 projects into the slots 21 at their junctures with the slots 19. The pin 20 is thus in position to be engaged by the slot 21 of either slide. When one slide is drawn downwardly it will push the pin 20, by reason of the cam surface of the slot wall, laterally in the slot 19 of the other slide. Both slides operate in the same manner, but only one slide can operate at a time. One slide will lock the other against operation. When the pin 20 is turned the lamp and other indicator will be turned. One slide will turn the pin 20 one way and the other slide will turn the pin the other way. Spiral springs 17 will restore the slides to their normal positions as soon as the slides are released. The casing 11 is rigid with the frame heretofore described.

The slides 13 and 14 have spring seats 15 at the upper ends and spring seats 18 are rigid with the casing 11 and the extensions 16, extending across the path of the springs 17 to support the springs. The slides 13 and 14 are operated by cords or cables 22 and 23. These cords are extended to a position convenient for the operator or chauffeur. A pull on the cord 22 and slide 14 will turn the pin 20 to the right and the lamp 1 to the left with the arrow 6. A pull on the cord 23 and slide 13 will turn the pin 20 to the left and the light 1 and arrow 6 to the right. The cords 22 and 23 are extended under the automobile under pulleys 32 and 33 and attached to pull buttons or knobs 34 located at any convenient place. The pull buttons 34 may be provided with shanks 35 and racks formed on the shanks and locks 36 provided for locking the buttons at different positions to hold the light and indicator at different positions.

The indicating devices may be duplicated on the rear of the vehicle, but only an arrow 26 is shown on the rear of the vehicle. The arrow 26 may be made to point in different directions. The mechanism for operating the arrow 26 is similar to the mechanism for operating the indicating devices in front of the vehicle. A casing 30, similar to casing 11, is mounted on the back of the vehicle. The arrow 26 is pivotally mounted on a pin 29 and a pin 36 is carried by the arrow and is rigid therewith. Slides 24 and 25 are similar to slides 13 and 14 and operated in the same manner. But the slots 28 in these slides 24 and 25 must be curved on account of the pivotal mounting of the lever 26. The pin 30 projects into the slots 28 at their juncture with the cam slots 27. Cords 37 and 38 are connected to the slides 24 and 25 and extended under pulleys 39, 40, and 41 and attached to the same pull buttons 34 so a pull on a button 34 will operate the light and indicator in front and also the indicator in the rear at the same time. When the button is released, all parts are restored to their normal positions by the springs 17.

In their normal positions the indicating devices cannot move. The pin 20 is locked by the walls 31 of the slots 19 against lateral movement. The slides 24 and 25 are locked in the same manner.

What I claim, is,—

1. Indicating mechanism comprising indicators, a rotatable shaft carrying said indicators, a pair of vertically movable slides having coöperating slots therein, and a pin rigid with said shaft projecting in the slots in said slides.

2. Indicating mechanism for automobiles comprising indicators, a rotatable shaft carrying said indicators and provided with a pin rigid with the shaft, coöperating vertically movable slides having coöperating slots therein into which said pin projects, and means extending from the seat of the automobile to said slides for operating said slides.

3. Indicating mechanism for automobiles comprising indicators, a rotatable shaft carrying said indicators, a pair of coöperating vertically movable slides having coöperating slots therein, operative connections between said slides and said indicators working in said slots, and selective members extending from the seat of the automobile and connected to said slides for turning said indicators to the right or to the left.

4. Indicating mechanism for automobiles comprising indicators, a rotatable shaft carrying said indicators and provided with a pin projecting therefrom, a pair of vertically movable slides engaging said pin and normally holding said shaft against rotation and provided with slots for permitting lateral movement of said pin and cam slots for causing said pin to move, and means for selectively moving said slides.

5. Indicating mechanism for moving vehicles comprising indicators, a rotatable shaft carrying said indicators and provided with a pin rigid therewith, a pair of coöperating slides having lateral slots and cam slots receiving said pin and normally holding the same against rotation, and means for selectively actuating said slides, one slide permitting the movement of said pin in the lateral slot and the cam slot of the slide being actuated causing said pin to move.

6. Indicating mechanism for moving vehicles comprising indicators provided with a turning device, a pair of movable slides operatively connected with said indicators, each slide having a lateral slot and a cam slot in communication therewith for said turning device, and means for selectively actuating said slides, one slide, when being actuated, serving to move said turning device and the other slide permitting said turning device to move in the lateral slot thereof.

7. Indicating mechanism for moving vehicles comprising indicators provided with a turning device, a pair of movable slides operatively connected with said indicators, each slide having a lateral slot and a cam slot communicating therewith for said turning device, means for selectively actuating said slides, one slide, when being actuated, serving to move said turning member and the other slide permitting said turning member to move in the lateral slot thereof, and a retractile spring for each slide for restoring the slide to normal position after the slide is actuated and released.

8. Indicating mechanism for moving vehicles comprising indicators provided with a turning device, a pair of movable slides operatively connected with said indicators, each slide having a lateral slot and a cam slot communicating therewith receiving said turning member and the cam slot of one slide coöperating with the lateral slot of the other slide in actuating said turning device, a retractile spring for each slide to restore the slide to normal position after actuation, and a casing for said slides and springs.

In testimony whereof, I set my hand in the presence of two witnesses, this 12th day of September, 1914.

CHARLES E. BOBERG.

Witnesses:
A. L. JACKSON,
B. Z. FRIEDMAN.

Copies of this patent may be obtained for five cents each, by addressing the "Commissioner of Patents, Washington, D. C."